Figure 1:
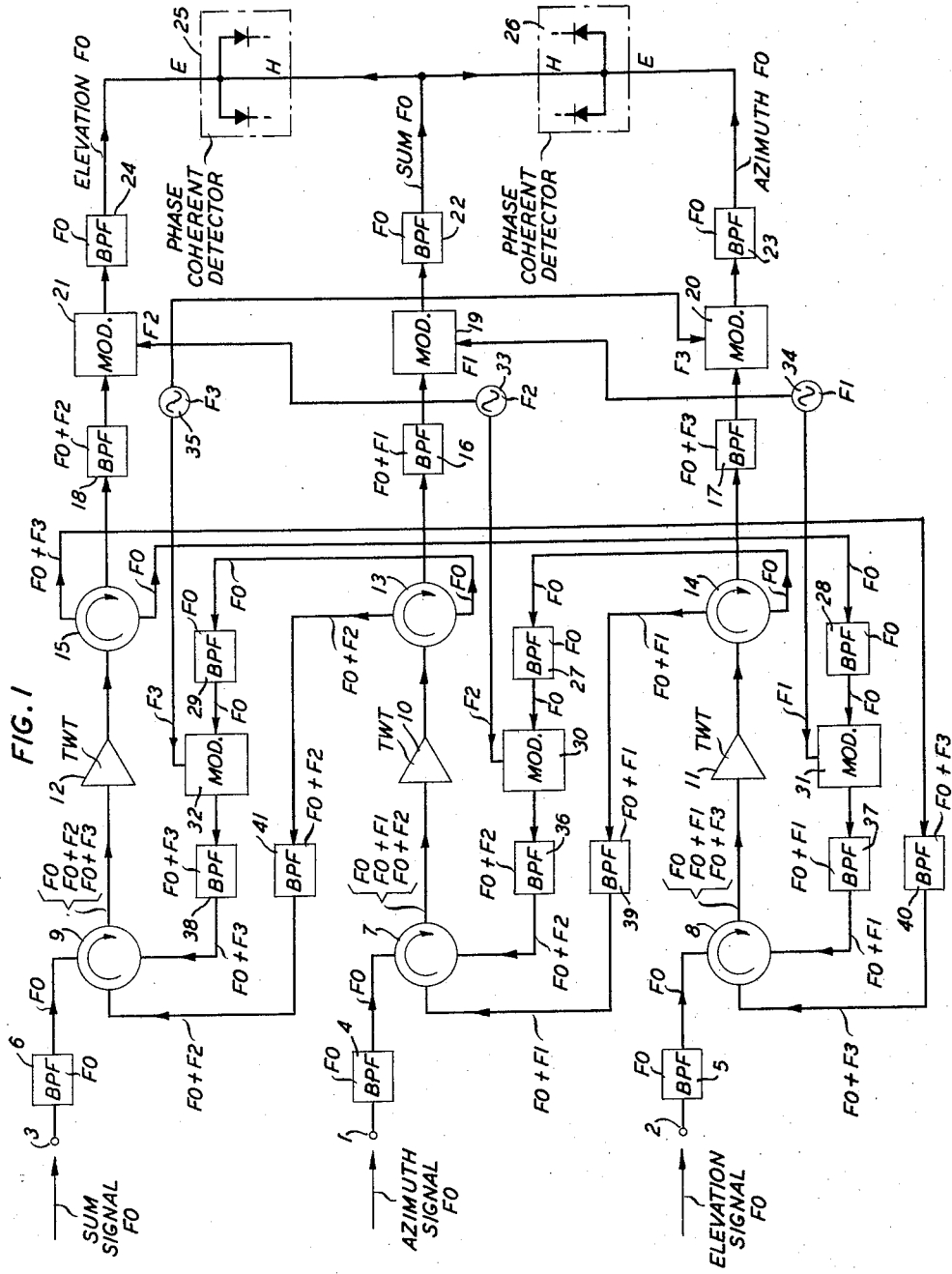

Feb. 15, 1966  D. A. ALSBERG ETAL  3,235,809
RELATIVE PHASE CORRECTION CIRCUIT
Filed Dec. 26, 1961  2 Sheets-Sheet 1

INVENTORS  D.A. ALSBERG
L.H. HENDLER
BY Walter M. Thiel
ATTORNEY

INVENTORS D. A. ALSBERG
L. H. HENDLER

ATTORNEY

United States Patent Office

3,235,809
Patented Feb. 15, 1966

3,235,809
RELATIVE PHASE CORRECTION CIRCUIT
Dietrich A. Alsberg, Berkeley Heights, and Louis H. Hendler, Mount Freedom, N.J., assignors to Bell Telephone Laboratories, Incorporated, New York, N.Y., a corporation of New York
Filed Dec. 26, 1961, Ser. No. 162,286
6 Claims. (Cl. 328—155)

This invention relates to multi-channel amplifier circuits and more particularly to a circuit means for correcting for the effects of relative phase shifts between the channels.

Because a traveling wave tube has a very low noise figure, a wide-band transmission capability and an inherent automatic overload capability, it is very attractive for use as the first stage of radio-frequency amplifiers in radars. However, earlier attempts to use them in monopulse radar systems, where the outputs of two or more channels are to be compared, have resulted in failure due to their inherently very large and erratic phase instability. The helix of these tubes is several wavelengths long so that relatively large variable phase shifts occur, largely due to power supply voltage variations and in some degree to differences in tube dimensions. Attempts to reduce these phase shifts in an active fashion by use of an automatic phase control circuit has involved considerable complexity and expense.

This invention, while of particular value in the use of traveling wave tubes, is not limited to radar or traveling wave tubes but is useful in other systems having uncontrollable phase instability from any cause whatever, the phase instability occurring in either one or both of two channels, the outputs of which are to be compared. The effect of the invention is to accept the phase shifts without expending any effort to control them and nullify their effects by causing the outputs of all channels to suffer the same total phase shift.

It is an object of this invention to simplify the means for utilizing traveling wave tubes in the first stage of radio frequency amplifiers, particularly in monopulse radar systems, thereby substantially eliminating the effects of phase errors and rendering the use of such tubes completely operative and economically feasible.

A further object is to correct for the effects of relative phase shifts between the outputs from the several channels of a multi-channel amplifier system.

The foregoing object is achieved by this invention which effectively passes the signal from each channel through its companion channel so that each channel signal is subjected to the same total phase shift regardless of the phase instability of one or more of the individual channels. Signal separation is accomplished by modulation of the signal output from each channel, passing only sidebands thereof through the companion channel and selecting, for detection, the sidebands that contain the total phase shift of all channels involved in the signals to be compared.

Figure 2:
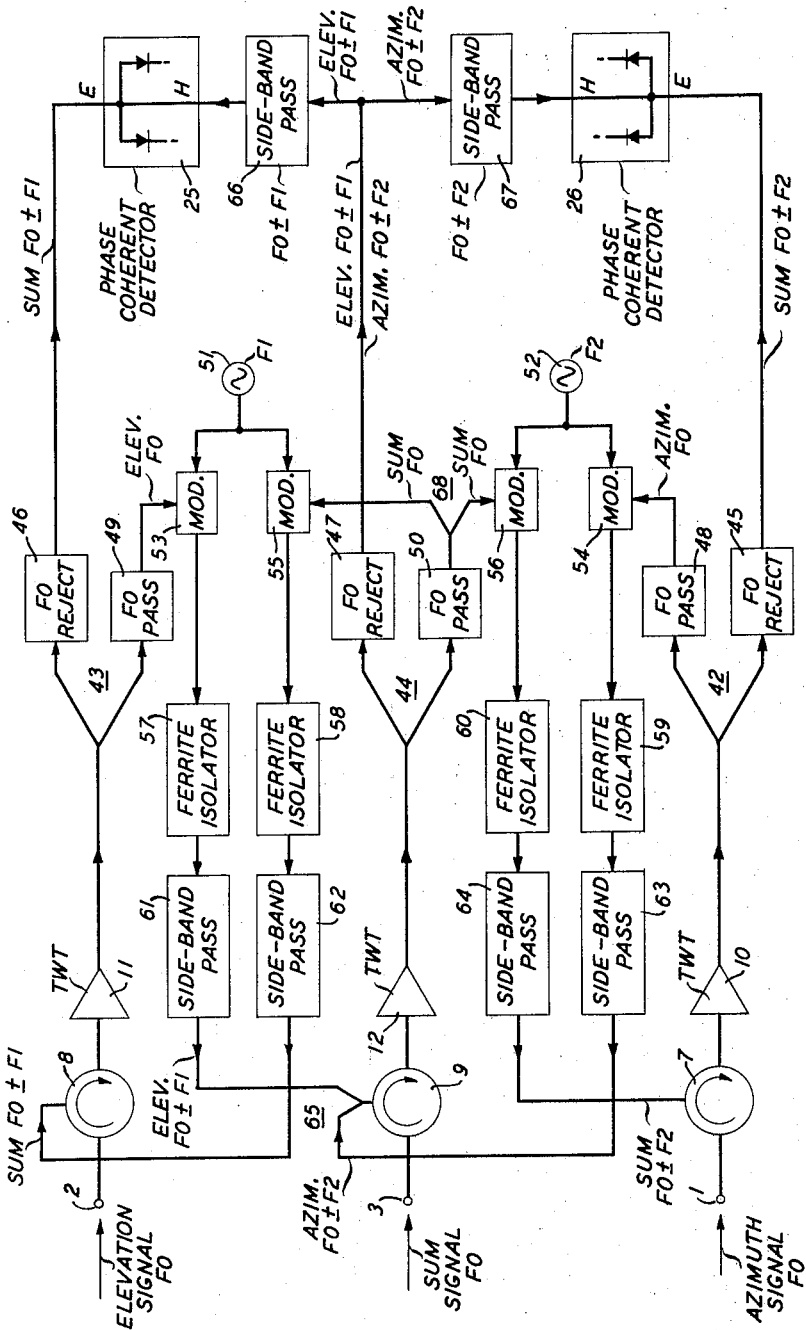

Reference may now be made to the accompanying drawings, in which:

FIG. 1 schematically discloses one embodiment of the invention as applied to a monopulse radar system where the signal of each of the three channels is effectively passed through both of the companion channels, and FIG. 2 discloses a preferred and simpler embodiment of a similar system where the signal from each channel is passed through only the companion channel which is to be involved in the comparison at the detector.

The general arrangement of both FIGS. 1 and 2 will be recognized as portions of well known monopulse tracking radar systems of the type where the azimuth and elevation return signals are each combined with the sum signal to derive the angle information. Systems broadly of this type are described in "Introduction to Monopulse" by D. R. Rhodes (1959), particularly chapter 4 thereof.

FIG. 1 shows a system in which the azimuth and elevation signals of frequency F0 enter their channels at terminals 1 and 2, respectively, while the sum signal of frequency F0 enters at terminal 3. As is well known, these signals are derived in other monopulse radar circuitry preceding this portion of the system. The purpose of this circuit is to compare the magnitudes of the azimuth and elevation signals with the sum signal, this function being performed by the phase coherent detectors 25 and 26. The functions of all of the intermediate circuitry is merely to amplify the incoming signals and to isolate them before applying them to the detectors. Amplification is provided in this case by the traveling wave tube amplifiers 10, 11 and 12 associated with the azimuth, elevation and sum signal channels, respectively. As previously mentioned, these amplifiers are subject to very large phase shifts, thus making proper comparison at the phase detectors virtually impossible when ordinary circuits are used. In this figure, the signal entering one of the channels emerges from its amplifier, is shifted in frequency and is passed through each of the other two amplifiers before application to the detector circuit.

For example, the azimuth signal entering from terminal 1 at frequency F0 passes through the band-pass filter 4 and enters the circulator 7. Each of the circulators in this figure will be observed to have four ports which will be designated, for convenience, the upper, lower, right and left ports, respectively. Thus the azimuth signal has entered circulator 7 at its upper port. The band-pass filters 36 and 39 connected to the lower and left ports, respectively, will not accept frequency F0 so it can exit only at the right port to enter the traveling wave tube amplifier 10, after which it enters the left port of circulator 13. It can emerge only from the lower port of circulator 13, pass through the band-pass filter 29 and enter one of the input terminals of modulator 32 where it is combined with frequency F3 coming from oscillator 35. The upper sideband of the modulation products will pass filter 38 and enter the lower port of circulator 9. The only port that it can emerge from this circulator is the right port where it enters amplifier 12 and the left port of circulator 15. This upper sideband can emerge only from the upper port of circulator 15 and enter the left port of circulator 8 by way of filter 40. It emerges from the right port of circulator 8, is amplified by amplifier 11, enters the left port of circulator 14 and emerges from the right port thereof, through filter 17 and is combined with frequency F3 in modulator 20, this frequency also being obtained from oscillator 35. The lower sideband from modulator 20, which is equal to the original frequency F0, passes filter 23 and enters one of the input terminals of the phase coherent detector 26. It will thus be seen that the azimuth signal has been caused to pass through all three traveling wave tube amplifiers. Similiar circuits may be traced for both the elevation and sum signal channels.

The elevation signal enters terminal 2, passes filter 5, enters the upper port of circulator 8, leaves by the right port thereof, is amplified by amplifier 11, enters the left port of circulator 14 and leaves by the lower port thereof, passes through filter 27 and modulator 30 where it is combined with frequency F2 from oscillator 33. The upper sideband passes through filter 36, enters the lower port of circulator 7, leaves by way of the right port, passes through amplifier 10, the left and upper ports of circulator 13, filter 41, the left and right ports of circulator 9, amplifier 12, the left and right ports of circulator 15, filter 18, is combined with frequency F2 in modulator 21 and the lower sideband is applied to one of the terminals of phase coherent detector 25 through filter 24. Here again it will be noted that the elevation signal has been caused to pass through all three amplifiers.

The sum signal enters terminal 3, passes through the circuitry in essentially the same manner as described for the other two signals and emerges from the right portion of circulator 13 as the upper sideband of this signal and frequency F1 from oscillator 34. It then passes through filter 16, modulator 19 where it is reduced to the original frequency F0, then passes through filter 22 and is applied to the other terminal of each of the two phase detectors 25 and 26.

It will now be seen that the elevation signal is combined with a sum signal in phase detector 25 only after both of these signals have suffered substantially the same phase shifts by reason of having passed through the same amplifiers and the same number of other circuit components. The same is true of the combination of the azimuth signal with the sum signal in phase detector 26.

FIG. 2 shows a simplified embodiment of the invention in which the number of circulators, modulators and oscillators have been reduced. In this embodiment, the signal from each channel is caused to pass through only those amplifier channels which are involved in the phase comparison. For example, the elevation signal is caused to effectively pass only through the channels including amplifiers 11 and 12 while the azimuth signal passes through only the channels including amplifiers 10 and 12. The sum signal modulation component which is to be compared with the elevation signal is caused to effectively pass through only amplifiers 12 and 11 and the modulation component which is to be compared with the azimuth signal is caused to effectively pass through only amplifiers 12 and 10. The manner in which this is done will be better understood by a more detailed description of the circuit.

Tracing first the path of the azimuth signal which enters terminal 1 and the left port of circulator 7, it leaves the right port and passes through amplifier 10. Emerging from the amplifier, it enters a power splitter or coupler 42. Since filter 45, connected to one leg of this coupler, rejects frequency F0, the azimuth signal can pass through only filter 48 and enters modulator 54 where it is combined with frequency F2 from oscillator 52. The output circuit of the modulator is connected to a ferrite isolator 59 which isolates the modulator from the sideband pass filter 63. This filter rejects frequency F0 and passes only the upper and lower sidebands, here designated as AZIM $F0 \pm F2$. This designation, for convenience, is employed to designate the presence of both the upper and lower principal sidebands. These two sidebands enter coupler 65 and the upper port of circulator 9. Energy at frequencies $F0 \pm F2$ cannot pass back through sideband pass filter 61 because it passes only the upper and lower sidebands $F0 + F1$. The sidebands of the azimuth signal then leave the right port of circulator 9, are amplified by the amplifier 12 and pass through coupler 44 and filter 47. This filter will pass both sidebands but will reject frequency F0 coming from the sum signal channel. Emerging from filter 47, the azimuth signal sidebands can pass through only filter 67 and into phase detector 26 where they are compared with the sidebands of the sum signal. It will be noted that the sidebands of the sum and azimuth signals have the same frequencies at detector 26.

The sidebands of the sum signal are derived through similar circuits. Starting with the input terminal 3, the sum signal passes through the left port of circulator 9, the right port of circulator 9, amplifier 12, coupler 44, filter 50 and coupler 68 where it divides and is impressed on both modulators 55 and 56. The energy supplied to modulator 56 is combined with frequency F2 from oscillator 52 to develop the sidebands which pass with the sum signal through the isolator 60. The sidebands only pass through the sideband pass filter 64 (which is identical in construction to filter 63 previously described) and enter the upper port of circulator 7. Emerging from the right port of circulator 7, they pass through amplifier 10, coupler 42, filter 45 and the other input terminal of the phase coherent detector 26. From this description it will be apparent that both the sum signal and the azimuth signal have passed through essentially the same number of circuit elements and have effectively passed through both of the amplifiers 10 and 12 which are involved in the comparison by detector 26.

Similar circuits may be traced for the elevation signal channel but in this case the signal is modulated in modulators 53 and 55 (corresponding in function with modulators 54 and 56) against frequency F1 from oscillator 51. While not limited to any particular frequencies, all three input signals may have a frequency of 9 kilomegacycles while oscillators 51 and 52 may have frequencies in the order of 200 megacycles and 300 megacycles, respectively. This difference of 100 megacycles in the sidebands is ample for proper frequency separation in these circuits. By tracing circuits similar to those traced for the sum and azimuth signals, it will be found that both signals are caused to pass through both amplifiers 11 and 12. The elevation signal sidebands emerging from filter 47 have frequencies $F0 \pm F1$ which pass through filter 66 to one of the input terminals of the detector 25. The sidebands of the sum signal, having the same frequencis as the elevation signal sidebands, emerge from filter 46 and are applied to the other input terminal of detector 25.

All of the circuit components represented by the various symbols in both FIGS. 1 and 2 are of conventional construction well known in this art and do not, per se, require detailed description.

As has been previously mentioned and which will now be more apparent, this invention is not necessarily limited to use with traveling wave tube amplifiers or radar systems, although it is especially adapted to such use. On the contrary, the invention is applicable to any case where two signals in separate channels are to be compared in a detector or similar apparatus which is sensitive to phase in stability inherent in one or more components in either or both of the signal channels. It is only required that the signals to be compared are caused to pass through all of the apparatus involved in the comparison. It may be mentioned that while the phase shift through traveling wave tube amplifiers is also sensitive to the frequency parameter, this effect may be rendered negligible by keeping the frequency shift produced in the modulators relatively small compared with the signal frequency. In the specific example mentioned for FIG. 2, frequency F1 of 200 megacycles is relatively small compared with 9 kilomegacycles, the frequency of the elevation signal F0. Consequently, the sidebands $F0 \pm F1$ are still of the same order of magnitude as the frequency F0 so that they suffer substantially the same phase shift through amplifier 12 as does the sum signal F0 with which these sidebands are to be compared. Moreover, each signal passes through its own amplifier at frequency F0 and through the companion amplifier at the two sideband levels so that any inequalities in tube construction tend to average out.

It will be noted that the circuit of FIG. 1 maintains phase coherence at the original base frequency F0 by reason of the demodulation against the original modulating frequencies F1, F2, and F3. In some cases it may be desirable to use this feature in the circuit of FIG. 2 where such demodulation has not been disclosed. In this event it may be introduced in this circuit in essentially the same manner as shown in FIG. 1. This can be done by introducing modulators between filter 67 and detector 26, between filter 66 and detector 25 and between filters 45 and 46 and their respective detectors. In the case of the modulators following filters 45 and 67, they would be demodulated against the frequency F2 of oscillator 52 and the original base frequency F0 is selected from the modulation products for detection. Similarly, the modulators in the other branch would be demodulated against the frequency F1 from modulator 51.

What is claimed is:

1. A circuit for correcting for relative phase shifts between multi-channel circuits, said circuit comprising at least two amplifier channels, each having an input circuit for receiving signals and an output circuit, at least one of said channels containing circuit structure subject to erratic phase shifts, a separate modulator coupled to each output circuit, a modulating source coupled to each modulator to develop in said modulator sidebands from signals passed through its amplifier channel, circuit means coupling each modulator to the input circuit of the other of the two channels to transmit said sidebands therethrough, and a frequency selective means coupled to each channel output circuit for separating for transmission at least one sideband from all other frequency components, whereby the selected sidebands from each channel may contain the total phase shift of at least said two channels.

2. A combination of claim 1 wherein at least one of said amplifier channels contains a traveling wave tube amplifier.

3. A circuit for correcting for relative phase shifts between multi-channel circuits, said circuit comprising three amplifier channels, each having an input circuit for receiving signals and an output circuit, at least one of said channels containing circuit structure subject to erratic phase shifts, a separate modulator coupled to each output circuit, a modulating source coupled to each modulator to develop in said modulator sidebands from signals passed through its amplifier channel, circuit means coupling each modulator to the input circuit of a second one of said three channels to transmit said sidebands therethrough, additional circuit means coupling the output circuit of said second channel to the input circuit of the third one of said three channels so that said sidebands are also transmitted through the third channel, and a frequency selective means coupled to each channel output circuit for separating for transmission at least one sideband from all other frequency components, whereby the selected sidebands from each channel may contain the total phase shift of all of said channels.

4. The combination of claim 3 wherein at least one of said amplifier channels contains a traveling wave tube amplifier.

5. A circuit for correcting for relative phase shifts between multi-channel circuits, said circuit comprising at least two amplifier channels, each having an input circuit and an output circuit, at least one of said channels containing circuit structure subject to erratic phase shifts, a separate modulator coupled to each output circuit, a modulating source coupled to each modulator to develop in said modulator sidebands from signals passed through its amplifier channel, means coupled to a modulator of one of the channels for transmitting only the sidebands developed therein to the input circuit of a second one of the channels, other means coupled to the modulator of said second one of the channels for transmitting only the sidebands developed therein to the input circuit of said one of the channels, and a frequency selective means coupled to each channel output circuit for selecting for transmission only the sidebands passing through that channel, whereby the selected sidebands from each channel may contain the total phase shift of both of said channels.

6. The combination of claim 5 wherein at least one of said amplifier channels contains a traveling wave tube amplifier.

References Cited by the Examiner
UNITED STATES PATENTS
2,771,518  11/1956  Sziklai _____ 330—84

ARTHUR GAUSS, *Primary Examiner.*